(12) United States Patent
Yanagi

(10) Patent No.: US 8,306,701 B2
(45) Date of Patent: Nov. 6, 2012

(54) VEHICLE TOE ANGLE CONTROLLER

(75) Inventor: Takashi Yanagi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 292 days.

(21) Appl. No.: 12/921,916

(22) PCT Filed: Mar. 12, 2009

(86) PCT No.: PCT/JP2009/054813
§ 371 (c)(1),
(2), (4) Date: Sep. 10, 2010

(87) PCT Pub. No.: WO2009/113642
PCT Pub. Date: Sep. 17, 2009

(65) Prior Publication Data
US 2011/0035113 A1 Feb. 10, 2011

(30) Foreign Application Priority Data

Mar. 12, 2008 (JP) .................. 2008-062462

(51) Int. Cl.
*B62D 6/00* (2006.01)
(52) U.S. Cl. ........................................... 701/41; 701/42
(58) Field of Classification Search .................... 701/36, 701/41, 42; 180/443, 444; 280/86.751
See application file for complete search history.

(56) References Cited

U.S. PATENT DOCUMENTS 8,186,477 B2 * 5/2012 Horiuchi ..................... 180/445
2003/0209869 A1 * 11/2003 Kwon ....................... 280/86.75
2010/0332083 A1 * 12/2010 Yanagi et al. .................. 701/42

FOREIGN PATENT DOCUMENTS

JP 06-47388 6/1994

* cited by examiner

*Primary Examiner* — Richard M. Camby
(74) *Attorney, Agent, or Firm* — Rankin, Hill & Clark LLP

(57) ABSTRACT

It is possible to drive a motor (7) with a high output during a low-speed travel and perform steering with a high resolution during a high-speed travel. An electric power steering device (1) causes the motor (7) to generate an auxiliary torque based on the steering torque specified by a driver for operating steering wheels (9), thereby reducing the steering torque specified by the driver. A control device (10) uses the vehicle speed signal (Vs) from a vehicle speed sensor (11) so as to drive the motor (7) with a high output during a low-speed travel and perform steering with a high resolution during a high-speed travel without increasing the motor output. Moreover, during a low-speed travel, a large steering torque is required and during a high-speed travel, steering should be performed with a high resolution. Thus, the driver's feeling in steering is not affected.

7 Claims, 9 Drawing Sheets

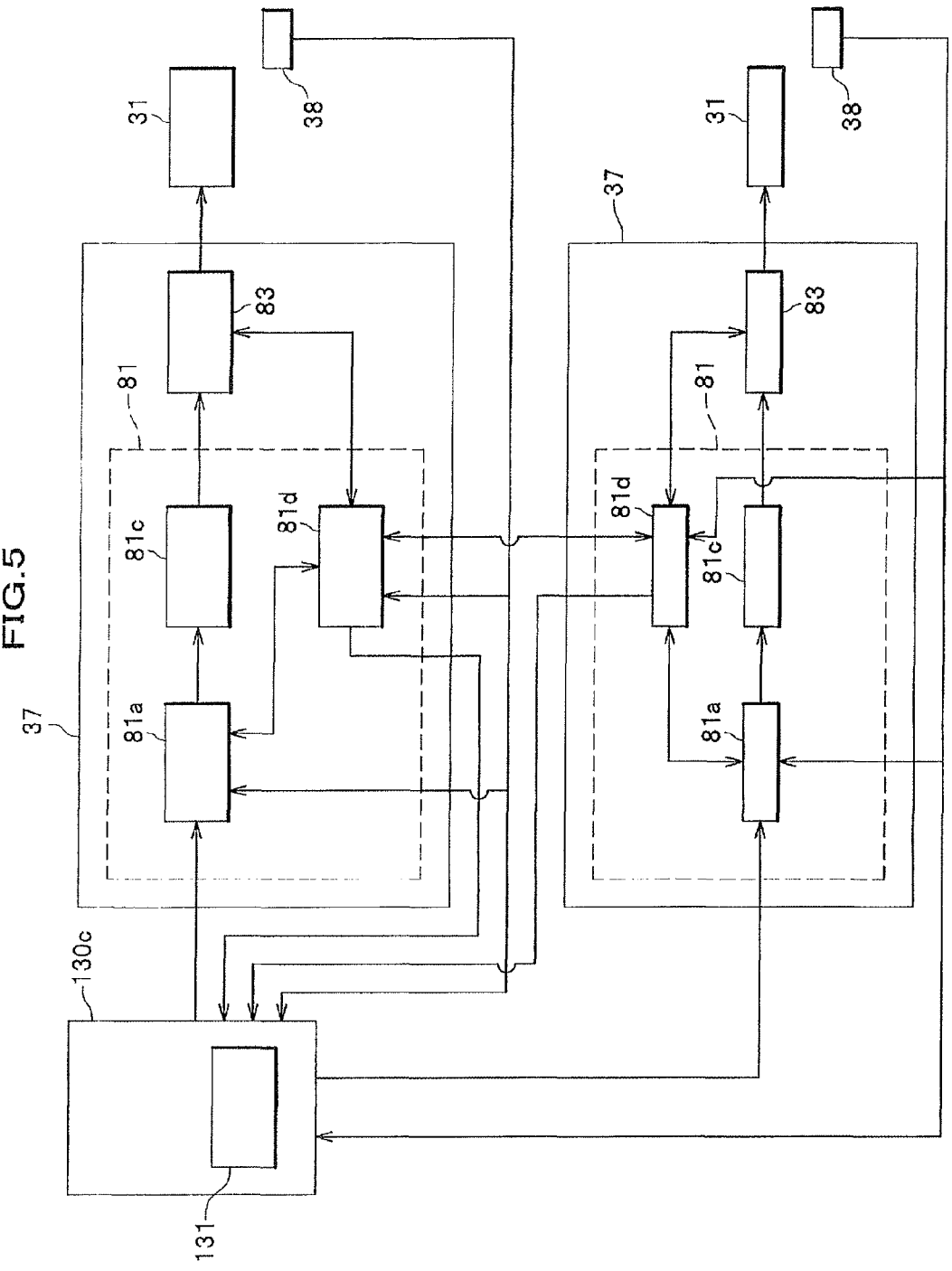

VEHICLE TOE ANGLE CONTROLLER

BACKGROUND OF THE INVENTION

1. Field of the Invention

The present invention relates to a toe angle controller which controls toe angles of rear wheels of a vehicle.

2. Description of the Related Arts

A technique is disclosed for a vehicle including a four-wheel independent steering system provided with toe angle controllers for the left and right rear wheels respectively to control the toe angles of the left and right rear wheels independently based on the steering angle of steered wheels and a vehicle speed, etc. The four-wheel independent steering system controls four wheels independently including front wheels (Refer to patent document 1, for example).

In such a vehicle, a control unit, which independently calculates target toe angles to be set to the left and right rear wheels, is provided to the toe angle controllers. The control unit transmits as command values the target toe angles to actuators which can independently turn the left and right rear wheels to turn the rear wheels and set the toe angles of the rear wheels.

Patent Document 1: Japanese Patent Publication No. 06-47388 (FIG. 2)

However, in the technique disclosed in the Patent Document 1, a case is not taken into consideration in which the output of an actuator provided to one of the toe angle controllers is insufficient and the turning amount of one of the rear wheels becomes insufficient. If the turning amount is insufficient, the toe angle of the rear wheel can not be set to be the target toe angle calculated by the control unit, which deteriorates the motion performance of the vehicle.

SUMMARY OF THE INVENTION

In order to solve the above problem, an actuator which is driven by a motor having a large thrust force may be used to compensate for the insufficient output of the actuator thereby to compensate for the insufficient turning amount of the rear wheel. However, this configuration has problems of increase in weight, growth in size and an increase in cost.

In view of this, an object of the present invention is to provide a toe angle controller of a vehicle which can reduce the deterioration of the motion performance of the vehicle even if the toe angle of one of the rear wheels can not be set to be a target toe angle calculated by a control unit.

To solve the above problem, the present invention according to Claim 1 is a toe angle controller of a vehicle including: actuators which are provided to left and right rear wheels and change toe angles of the left and right rear wheels; a control unit which independently calculates target toe angles to be set to the left and right rear wheels, and transmits the target toe angles to the actuators as command values; toe angle detection units which independently detect actual toe angles of the left and right rear wheels; and correction units each of which corrects the target toe angle to be set to one of the left and right rear wheels based on a difference between the target toe angle and the actual toe angle of the other one of the left and right rear wheels, the actual toe angle being detected by the toe angle detection unit.

In accordance with the invention of Claim 1, in the toe angle controller including the actuators which can independently set the toe angles of the left and right rear wheels of the vehicle, the target toe angle which is calculated by the control unit and is to be set to one of the left and right rear wheels can be corrected in accordance with the difference between the target toe angle calculated by the control unit which controls the actuators and the actual toe angle of the other one of the left and right control unit, the actual toe angle detected by the toe angle detection unit.

The present invention according to Claim 2 is the toe angle controller, wherein the control unit calculates the target toe angles based on steering angles of steered wheels detected by a steering angle detection unit provided to the vehicle and a vehicle speed detected by a vehicle speed detection device provided to the vehicle.

In accordance with the invention of Claim 2, the control unit can calculate the target toe angle based on the steering angle of the steered wheel and the vehicle speed.

The invention of Claim 3 is the toe angle controller wherein if a difference between the target toe angle and the actual toe angle of a turning outer wheel of the rear wheels is equal to or more than a predetermined value in a case where the vehicle turns, the actual toe angle being detected by the toe angle detection unit, the correction unit corrects the target toe angle to be set to a turning inner wheel of the rear wheels in accordance with the difference.

In accordance with the invention of Claim 3, if a difference between the target toe angle calculated by the control unit and the actual toe angle of a turning outer wheel of the rear wheels is equal to or more than a predetermined value in a case where the vehicle turns, the actual toe angle being detected by the toe angle detection unit, the correction unit can correct the target toe angle to be set to a turning inner wheel of the rear wheels in accordance with the difference.

The present invention of Claim 4 is the toe angle controller, wherein the vehicle includes a lateral G sensor which detects a lateral acceleration, and the correction unit corrects the target toe angle by calculating a correction amount based on a value obtained by multiplying the lateral acceleration detected by the lateral G sensor with a value of the difference and adding the correction amount to the target toe angle.

In accordance with the invention of Claim 4, the vehicle includes a lateral G sensor, and the correction unit can correct the target toe angle by calculating a correction amount based on a value obtained by multiplying the lateral acceleration detected by the lateral G sensor with a value of the difference and adding the correction amount to the target toe angle.

In accordance with the present invention, it is possible to provide a toe angle controller of a vehicle which can reduce the deterioration of the motion performance of the vehicle even if the toe angle of one of the rear wheels can not be set to be a target toe angle calculated by a control unit.

BRIEF DESCRIPTION OF THE DRAWINGS

FIG. 5 is a block diagram showing the configuration of a toe angle change control ECU.

DESCRIPTION OF THE REFERENCE NUMERALS

1(1L, 1R) Front wheel (Steered wheel)
2(2L, 2R) Rear wheel
3 Steering wheel
26 Steering angle sensor (Steering angle detection unit)
30 Actuator
37 Toe angle change control ECU
38 Stroke sensor (Toe angle detection unit)
110 Steering unit
120(120L, 120R) Toe angle controller
130 Steering control ECU
130c Toe angle control ECU (Control unit)
131 Correction angle calculation unit (Correction unit)
$S_V$ Vehicle speed sensor (Vehicle speed detection unit)
$S_T$ Torque sensor
$S_G$ Lateral G sensor
V Vehicle

PREFERRED EMBODIMENTS OF THE INVENTION

The best embodiment for implementing the present invention is described in detail below with reference to the accompanying drawings as appropriate.

First, a vehicle including a toe angle controller according to the embodiment is described with reference to FIGS. 1 to 5.

Figure 1:
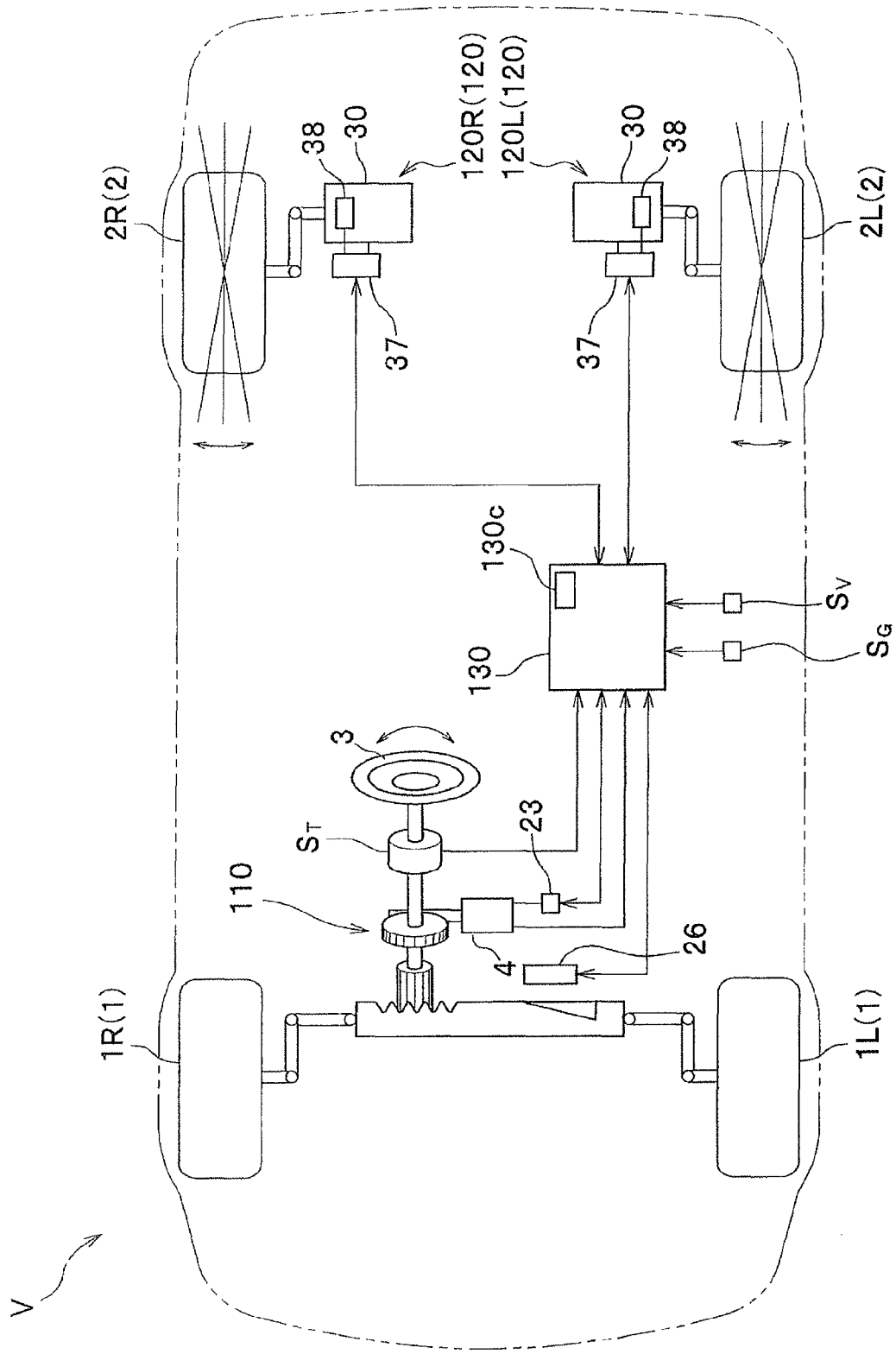
FIG. 1 is a diagram of a four-wheel drive vehicle provided with a toe angle controller according to the present invention.
Figure 2:
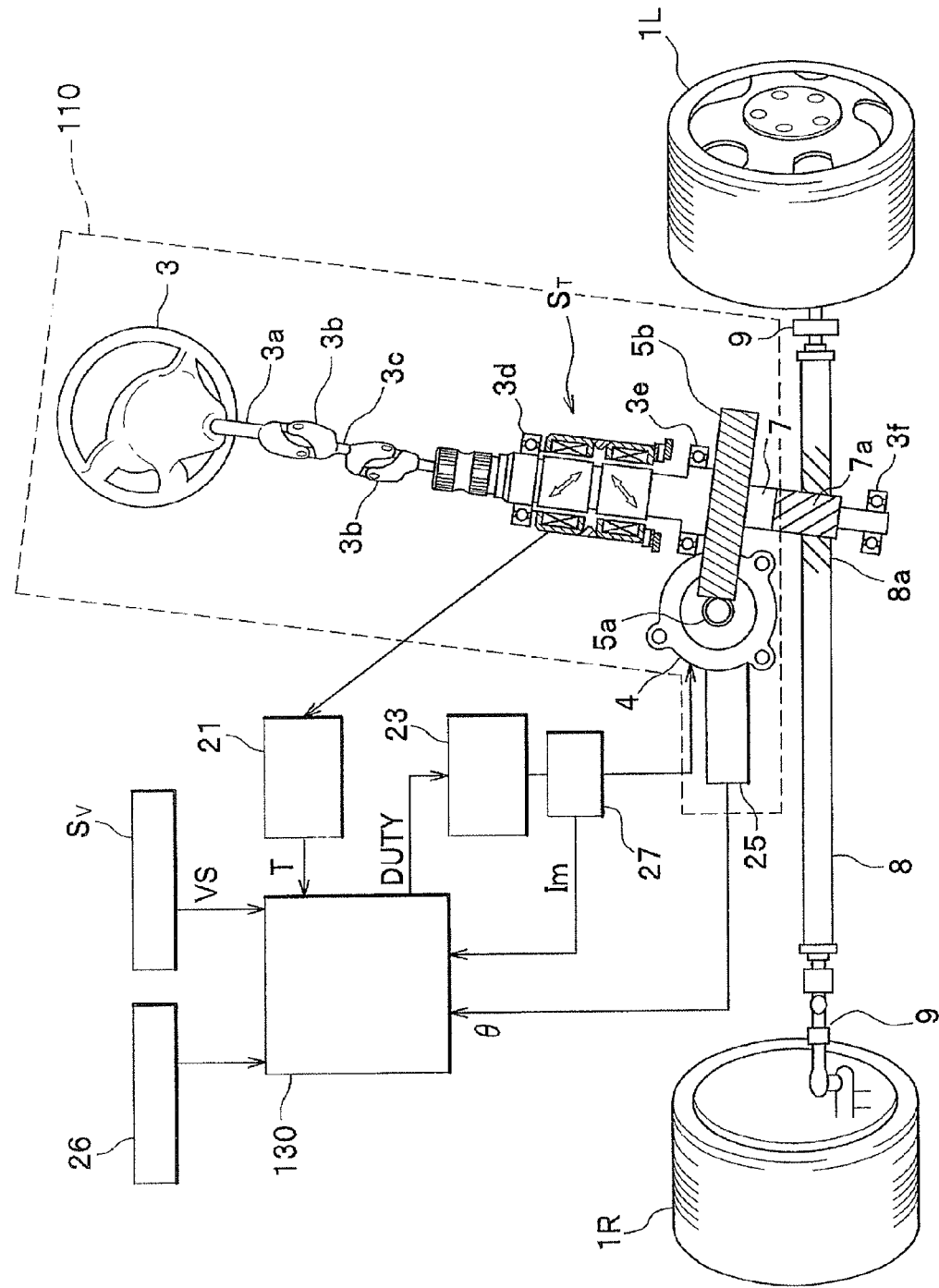
FIG. 2 is a structure illustration of a steering unit.
Figure 3:
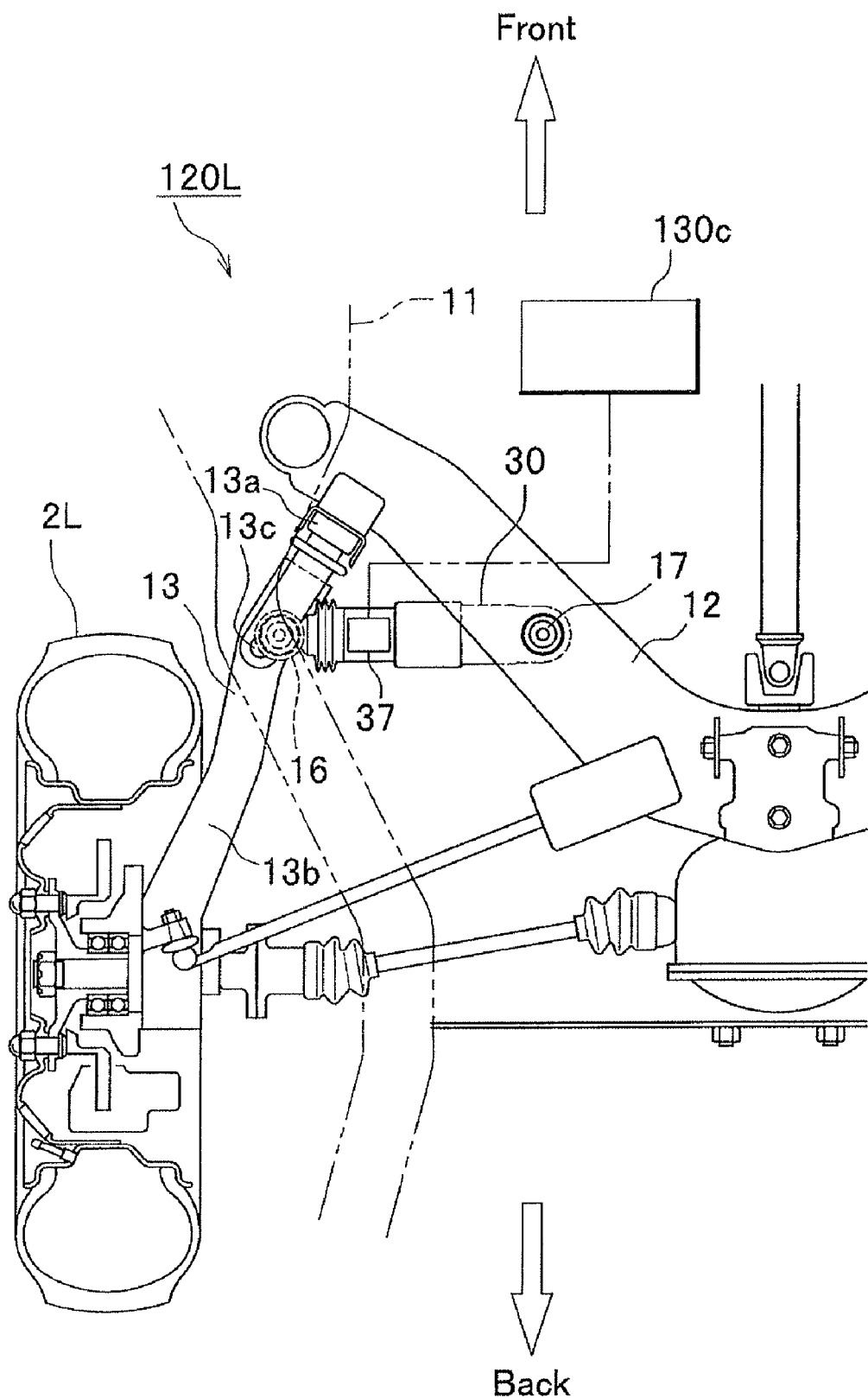
FIG. 3 is a structure illustration of a toe angle controller of a left wheel.
Figure 4:
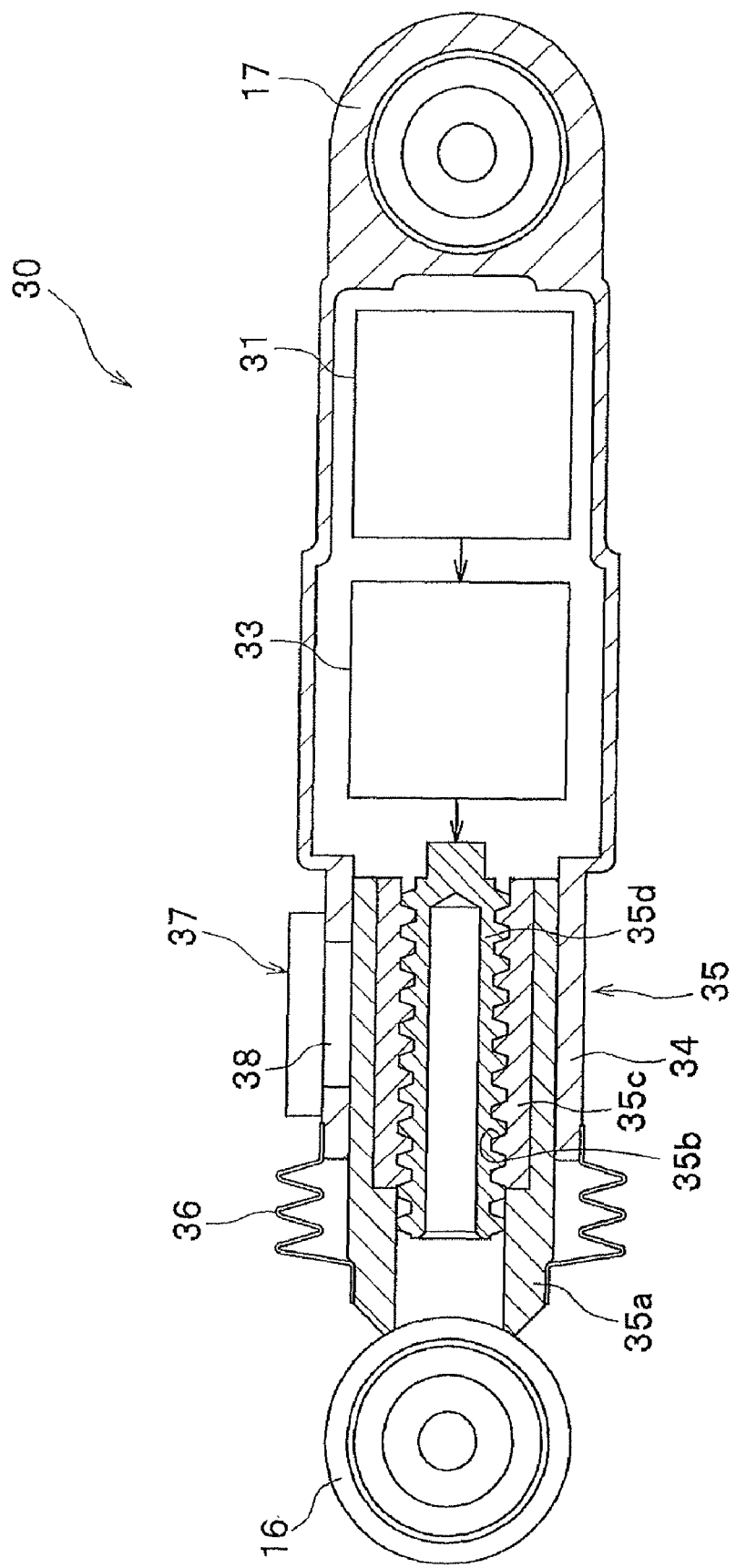
FIG. 4 is a structure illustration of an actuator of the toe angle controller.

FIG. 1 is a diagram of a four-wheel drive vehicle provided with a toe angle controller according to the present invention. FIG. 2 is a structure illustration of a steering unit. FIG. 3 is a structure illustration of a toe angle controller of a left rear wheel. FIG. 4 is a structure illustration of an actuator of the toe angle controller.

As shown in FIG. 1, a vehicle V according to the embodiment is provided with a steering unit 110 including a steering wheel 3 by which front wheels 1L, 1R are steered, toe angle controllers 120L, 120R which independently controls rear wheels 2L, 2R respectively according to the steered angles of the front wheels 1L, 1R and a vehicle speed, a steering control device 130 (hereinafter, also referred to as a steering control ECU) for controlling the steering unit 110 and the toe angle controllers 120L, 120R, and various sensors such as a vehicle speed sensor $S_V$ and a lateral G sensor $S_G$.

The left and right front wheels 1L, 1R are steered wheels which determine the traveling direction of the vehicle V. A driver operates the steering wheel 3 to steer the front wheels 1L, 1R so that the vehicle V is turned in right or left direction.

The lateral G sensor $S_G$ is a sensor which detects acceleration in a lateral direction with respect to the front-back direction of the vehicle V. The lateral G sensor $S_G$ detects the lateral acceleration of the vehicle V, and outputs an electric signal which corresponds to the amplitude and the direction of the lateral acceleration.

The vehicle speed sensor $S_V$ detects the number of pulses per a unit time as the vehicle speed $V_S$ of the vehicle V and outputs a vehicle speed signal. Since the vehicle speed sensor $S_V$ has a function of detecting the vehicle speed $V_S$ of the vehicle V the vehicle speed sensor $S_V$ corresponds to "a vehicle speed detection unit" described in Claims.

A steering angle sensor 26 is a sensor which detects the steering angle of the front wheels 1 and is comprised of a rack position sensor for detecting the movement amount of a rack shaft 8 (see FIG. 2), for example. The steering angle sensor 26 is connected to the steering control ECU 130 with a signal line and inputs the detection signal of the movement amount of the rack shaft 8 to the steering control ECU 130.

Since the steering angle sensor 26 has a function of detecting the steering angle of the front wheels 1 (steered wheel), the steering angle sensor 26 corresponds to "a steering angle detection unit" described in Claims.

In the steering unit 110, the main steering shaft 3a to which the steering wheel 3 is attached, the steering shaft 3c and the pinion shaft 7 are connected to one another by two universal joints 3b, 3b as shown in FIG. 2. The pinion gear 7a provided at the lower end of the pinion shaft 7 is meshed with rack teeth 8a of the rack shaft 8 which can move reciprocatory in a vehicle width direction. Left and right front wheels 1L, 1R are connected to ends of the rack shaft 8 via tie rods 9, 9. With this configuration, the steering unit 110 can change the traveling direction of the vehicle when the steering wheel 3 is operated. The rack shaft 8, the rack teeth 8a and tie rods 9, 9 here constitute a steering mechanism. The pinion shaft 7 is supported by a steering gear box (not shown) at its upper, middle and lower portions via shaft bearings 3d, 3e, and 3f, respectively.

The steering unit 110 may include a motor 4 which applies assist steering force (assist torque) as motorized force for reducing the steering force of the steering wheel 3. In this configuration, a warm gear 5a provided to the output shaft of the motor 4 is meshed with a worm wheel gear 5b provided to the pinion shaft 7.

In addition, the vehicle V (see FIG. 1) also includes an electric motor drive circuit 23 configured to drive the electric motor 4; a resolver 25; a torque sensor $S_T$ configured to detect (measure) a pinion torque $T_P$ applied to the pinion shaft 7; a differential amplifier 21 configured to amplify the output from the torque sensor $S_T$; and the vehicle speed sensor $S_V$. If the motor 4 is not provided, the vehicle V may be configured not to include the motor driving circuit 23 and the resolver 25.

The torque sensor $S_T$ is configured to detect (measure) the pinion torque $T_P$ applied to the pinion shaft 7. The torque sensor $S_T$ is formed of magnetostrictive films adhered to the pinion shaft 7 at two different positions along an axis thereof so as to exhibit opposite anisotropies, and detection coils are arranged with a gap from the pinion shaft 7 along the surface (outer circumference) of the respective magnetostrictive films. The differential amplifier 21 is configured to amplify a difference in permeability change between two magnetostrictive films detected as an inductance change by the detection coil, and to output a torque signal T.

The steering control ECU 130 includes a microcomputer with components, such as CPU (Central Processing Unit), ROM (Read Only Memory), RAM (Random Access Memory) (not shown), and a peripheral circuit and the like. The steering control ECU 130 is controlled by programs stored, for example, in a ROM.

The steering control ECU 130 is connected to the vehicle speed sensor $S_V$, the differential amplifier 21 and the lateral G sensor $S_G$ (see FIG. 1) with signal lines, and the vehicle speed detected by the vehicle speed sensor Sy, a torque signal T detected by the differential amplifier 21 and a lateral acceleration detected by the lateral G sensor $S_G$ are input to the steering control ECU 130. If the motor 4 is provided, the steering control ECU 130 also includes a function of calculating a duty signal for driving the motor 4 based on the vehicle speed detected by the vehicle speed sensor $S_V$ and the pinion torque $T_P$ detected by the torque sensor $S_T$, etc. and inputting the duty signal to the motor driving circuit 23.

The electric motor drive circuit 23 has a plurality of switching elements, and is configured to drive the motor 4 based on the duty signals from the steering control ECU 130. The electric motor drive circuit 23 also has a function to detect (measure) a three-phase electric motor current $I_m$ (IU, IV, IW) using a Hall element (not shown).

The resolver 25 is configured to detect (measure) a rotation angle $\theta_m$ of the electric motor 4 and to output an angular signal $\theta$, and examples include a sensor for detecting a change in magnetoresistance which is positioned in the vicinity of a magnetic rotor having a plurality of recess portions and projection portions arranged evenly along a circumference of the rotor (not shown).

In FIGS. 1 and 2, the steering unit 110 includes a so-called power steering device which generates assist steering force for assisting the steering of the steering wheel 3 by the motorized force of the motor 4, however, the present embodiment may be applied to the steering unit 110 which does not include a power steering device.

Next, a structure of the toe angle controller is described with reference to FIGS. 3 and 4.

The toe angle controllers 120L, 120R (120) are respectively connected to the left and right rear wheels 2L, 2R. FIG. 3 shows the left side toe angle controller 120L which is connected to the left rear wheel 2L. As shown in FIG. 3, the toe angle controller 120L includes an actuator and the toe angle changing controller (also referred to as a toe angle changing control ECU, hereinafter) 37. The right side toe angle controller 120R (see FIG. 1) has the same configuration as that of the left side toe angle controller 120L except that they are symmetry.

As shown in FIG. 3, the cross member 12 extends substantially in the vehicle width direction, and end portions (in terms of the vehicle width direction) thereof are elastically supported by a rear side frame 11 of the vehicle body. A trailing arm 13 extends substantially in the front-rear direction of the vehicle body, and a front end portion thereof is supported by a portion near the terminal (in terms of the vehicle width direction) of the cross member 12. The rear wheel 2L is fixed to a rear end portion of the trailing arm 13.

The trailing arm 13 is formed of a vehicle body-side arm 13a attached to the cross member 12, and a wheel-side arm 13b fixed to the rear wheel 2L, which are connected to each other through a nearly vertical rotation axis 13c. With this configuration, the trailing arm 13 is displaceable in the vehicle width direction.

With respect to the actuator 30, one end portion is attached through a ball joint 16 to a front end portion of the wheel-side arm 13b relative to the rotation axis 13c, and the other end (base end) portion of the actuator 30 is fixed to the cross member 12 through a ball joint 17.

As shown in FIG. 4, the actuator 30 includes an electric motor 31, a deceleration mechanism 33, a feed screw portion 35 and the like.

The electric motor 31 may be a brush motor, a brushless motor or the like, which can rotate in both forward and reverse directions.

The deceleration mechanism 33 is formed, for example, of double planetary gears (not shown) or the like assembled therein.

The feed screw portion 35 includes: a rod 35a in a shape of a cylinder; a nut 35c which has an internal thread 35b and is inserted in the rod 35a; and a screw shaft 35d which engages with the internal thread 35b and supports the rod 35a in such a manner that the rod 35a is movable in an axial direction. The feed screw portion 35, the deceleration mechanism 33 and the electric motor 31 are encased in a case body 34 in an elongated cylinder shape. An end of the deceleration mechanism 33 is coupled with the output shaft of the motor 31 and the other end of the deceleration mechanism 33 is coupled with the screw shaft 35d.

When the power of the electric motor 31 is transmitted through the deceleration mechanism 33 to the screw shaft 35d to rotate the screw shaft 35d, the rod 35a shifts in a right-left direction in the drawing (axial direction) relative to the case body 34, and thus the actuator 30 contracts or expands. A boot 36 is attached to the actuator 30 to keep out outside foreign materials such as dust or water.

The actuator 30 also includes a stroke sensor 38 configured to detect (measure) the position of the rod 35a (i.e., amount of expansion/contraction). In the stroke sensor 38, a magnet or the like is embedded so as to detect (measure) the location of the rod 35a by utilizing magnetism. In this manner, by detecting the extension/contraction amount of the rod 35a using the stroke sensor 38, the actual value of the steering angles (toe angle) of toe-in or toe-out of the rear wheels 2L is detected with high accuracy. The stroke sensor 38 corresponds to "a toe angle detection unit" described in Claims.

In the actuator 30 having the configuration as described above, the ball joint 16 provided on an end portion of the rod 35a is rotatably connected to the wheel-side arm 13b of the trailing arm 13 (see FIG. 3), and the ball joint 17 provided on the base end of the case body 34 is rotatably connected to the cross member 12 (see FIG. 3). When the power of the electric motor 31 rotates the screw shaft 35d and the rod 35a shifts leftward (in FIG. 4) (i.e., the actuator 30 expands), the wheel-side arm 13b is pushed outward in the vehicle width direction (left direction in FIG. 3) to thereby leftward turn the rear wheel 2L. On the other hand, when the rod 35a shift rightward (in FIG. 4) (i.e., the actuator 30 contracts), the wheel-side arm 13b is pulled inward in the vehicle width direction (right direction in FIG. 3) to thereby rightward turn the rear wheel 2L.

The actuator has a function of changing the toe angle of the rear wheel 2L by turning the rear wheel 2L.

It should be noted that the position to which the ball joint 16 of the actuator 30 is attached is not limited to the wheel-side arm 13b and the actuator 30 can be attached to any position, such as on a knuckle arm, as long as the toe angle of the rear wheel 2L can be changed. In addition, in the present embodiment, the toe angle controllers 120L, 120R are applied to an independent suspension system with semi-trailing arms. However, the present invention is not limited to this type of suspension system, and may be applied to other types of suspension system.

In addition, the toe angle change control ECU 37 is unified with the actuator 30. The toe angle change control ECU 37 is fixed to the case body 34 of the actuator 30 and is connected to the stroke sensor 38 through connectors or the like.

To the toe angle change control ECU 37, power is supplied from a power source (not shown), such as a battery, mounted on a vehicle V (see FIG. 1). Also to the steering control ECU 130 and the electric motor drive circuit 23, power is supplied from a power source (not shown), such as battery, which is an independent system of that of the toe angle change control ECU 37.

Next, the detailed configuration of the toe angle changing control ECU 37 will be described with reference to FIG. 5. FIG. 5 is a block configuration diagram showing a configuration of the toe angle change control ECU 37. As shown in FIG. 5, the toe angle changing control ECU 37 has a function to drive control the actuator 30, and includes a control part 81 and an electric motor drive circuit 83. Each toe angle change control ECU 37 is connected to the toe angle control ECU 130c through a communication line, and also to the other toe angle change control ECU 37 through a communication line.

The control part 81 includes a CPU, a RAM, a ROM and a peripheral circuit, and has a target current calculating part 81a, a motor control signal generation part 81c and the self-diagnostic part 81d.

The target current calculating part 81a is configured to calculate a target current signal based on a target value signal, which is a signal indicating a target toe angle of the rear wheel 2L (or the rear wheel 2R) calculated by the toe angle control ECU 130c, and to output the target current signal to the motor control signal generation part 81c. Herein, the target current signal is a current signal required for setting the actuator 30 (see FIG. 4) to be operated in a desired operation amount (amount of expansion/contraction of the actuator 30 that allows the rear wheel 2L (or 2R) to be turned into a desired toe angle).

The target current calculating part 81a uses the target current signal as a reference signal and calculates a correction current signal for correcting the target current signal from a difference between the target toe angle indicated by the target current signal and an actual toe angle of the rear wheel 2 by using the target toe angle signal of the rear wheel 2 (see FIG. 1) on the side where this target current calculating part 81a is provided, position information input from the stroke sensor 38 and the reference signal which is the target current signal. The correction current signal is then added to the target current signal, and the corrected target current signal is output to the motor control signal generation part 81c.

By correcting the target current signal as described above, the variation of a current value required for turning the rear wheel 2L (or 2R) due to the vehicle speed, road condition, operation status of the vehicle V and a worn status of a tire can be feedbacked to control the toe angles of left and right rear wheels 2L, 2R to be set to be the target toe angles, respectively.

The motor control signal generation part 81c is configured to receive the target current signal from the target current calculating part 81a and to output the motor control signal to the electric motor drive circuit 83. The motor control signal includes a value of the current to be supplied to the electric motor 31, and a direction of the current. The electric motor drive circuit 83 is formed of, for example, a bridge circuit with FET and is configured to apply an electric motor voltage to the electric motor 31, based on the motor control signal.

As shown in FIG. 5, in the embodiment, the self-diagnostic part 81d of the control part 81 receives position information from the stroke sensor 38, a signal indicating the status of the motor driving circuit 83, the target current signal from the target current calculating part 81a and checks whether or not an anomaly detection signal is received from the other toe angle change control ECU 37 which the self-diagnostic part 81d itself does not belong to. In other words, the self-diagnostic part 81d monitors a signal indicating whether or not the motor 31 and the motor driving circuit 83 of the own toe angle change control ECU 37 is normally operated, and at the same time, monitors a signal indicating whether or not the motor 31 and the motor driving circuit 83 of the other toe angle change control ECU 37 is normally operated.

If the self-diagnostic part 81d detects that the toe angle indicated by the stroke sensor 38 has been different from the toe angle (indicated by the target current signal) of the rear wheel 2 (see FIG. 1) of the side of the self-diagnostic part 81d for a period equal to or more than a predetermined time by a value equal to or more than a predetermined value, the self-diagnostic part 81d makes the target current value calculation unit 81a calculate a target current signal which corresponds to a predetermined toe angle (e.g. 0 degree) and set a correction current corresponding to the target toe angle of 0 degree. The self-diagnostic part 81d then transmits an anomaly detection signal to the self-diagnostic part 81d of the other toe angle change control ECU 37.

The toe angle controller 120 (see FIG. 1) which includes the toe angle change control ECU 37 configured as described above is individually provided to the left and right rear wheels 2L, 2R (see FIG. 1) to individually turn the left and right rear wheels 2L, 2R, whereby the toe angles of the left and right wheels are set in angles different from each other.

Furthermore, the toe angle control ECU 130c (see FIG. 3) is connected to the stroke sensors 38 (see FIG. 4) of the actuators (see FIG. 4) which are provided to the left and right toe angle controllers 120L, 120R (see FIG. 1) with signal lines, and detects the toe angles of the left and right rear wheels 2L, 2R (see FIG. 1) based on the extension/contraction amount of the rod 35a (see FIG. 4) input from the stroke sensor 38. The toe angle control ECU 130c is provided with a corrected angle calculation unit 131. The corrected angle calculation unit 131 is described in detail later.

The toe angle control ECU 130c which controls the toe angle controllers 120 (see FIG. 1) is incorporated, for example, in the steering control ECU 130 (see FIG. 1) and is comprised of a micro computer with components such as a CPU, a ROM and a RAM and peripheral circuits, and the like. The toe angle control ECU 130c is controlled by programs stored in a ROM for example. Alternatively, the toe angle control ECU 130c may be configured by a software logic which is incorporated in programs controlling the steering control ECU 130.

The toe angle control ECU 130c has a function of inputting the movement amount of the rack shaft 8 (see FIG. 2) of the front wheels 1 (see FIG. 1) input from the steering angle sensor 26 (see FIG. 1) and the vehicle speed of the vehicle V input from the vehicle speed sensor $S_V$ (see FIG. 1) to the steering control ECU 130 (see FIG. 1). The toe angle control ECU 130c calculates toe angles which are to be set to the left and right rear wheels 2L, 2R (see FIG. 1) based on a steering angle calculated from the input movement amount of the rack shaft 8 and the vehicle speed input from the vehicle speed sensor $S_V$. The toe angle control ECU 130c transmits a command angle whose target value is the calculated toe angle to the toe angle controller 120 as a command value to turn the left or right rear wheels 2L, 2R. Hereinafter, the command angle for the left toe angle controller 120L is referred to as a left command angle $C\theta_L$ and the command angle for the right toe angle controller 120R is referred to as a right command angle $C\theta_R$.

When the vehicle V (see FIG. 1) is turning, the toe angle control ECU 130c calculates the toe angles of the left and right rear wheels 2L, 2R (see FIG. 1) by which a lateral force is generated for assisting the turning of the vehicle V. The toe angle control ECU 130c also calculates the left command angle $C\theta_L$ and the right command angle $C\theta_R$ whose target values are the calculated toe angles, and transmits the left command angle $C\theta_L$ to the left toe angle controller 120L as a command value and also transmits the right command angle $C\theta_R$ to the right toe angle controller 120R as a command value. Thus, the toe angles of the left and right rear wheels 2L, 2R are set.

Based on the above description, the toe angle control ECU 130c corresponds to "a control unit" described in Claims.

More specifically, when the vehicle V (see FIG. 1) is turning, the toe angle control ECU 130c calculates the toe angles of the left and right rear wheels 2L, 2R by which the left and right rear wheels 2L, 2R are turned in a direction opposite to the turning direction of the vehicle V. The toe angle control ECU 130c also transmits the command angles $C\theta_L$, $C\theta_R$ to the left and right toe angle controllers 120L, 120R respectively, to turn the left and right rear wheels 2L, 2R and set the toe angles of left and right rear wheels 2L, 2R. This technique has already been disclosed as a publicly known technique, and thus the detailed description thereof is omitted. Hereinafter, the actual toe angle of the rear wheel 2 which is set by the toe angle controller 120 is referred to as an actual angle $\theta_T$. The actual angle of the left rear wheel 2L is referred to as a left actual angle $\theta_{TL}$ and the actual angle of the rear wheel 2R is referred to as a right actual angle $\theta_{TR}$.

When a vehicle turns in a high lateral acceleration or with a large load quantity for example, an excessive load is applied to a turning outer rear wheel (the left rear wheel 2L when turning right and the right rear wheel 2R when turning left), and thus, the output of the actuator (see FIG. 3) may be insufficient, which causes insufficient turning of the turning outer rear wheel 2. As a result, a difference $\Delta\theta$ may be generated between the command angle $C\theta$ calculated by the toe angle control ECU 130c and the actual angle $\theta_T$ of the turning outer rear wheel 2. In short, the command angle $C\theta$ calculated by the toe angle control ECU 130c is not set in the toe angle of the turning outer rear wheel 2. In other words, the toe angle of the turning outer rear wheel 2 is not set to be equal to the command angle $C\theta$. Thus, a lateral force generated by the set toe angle of the turning outer rear wheel 2 is decreased, which may deteriorate the motion performance of the vehicle V (see FIG. 1).

Figure 6A:
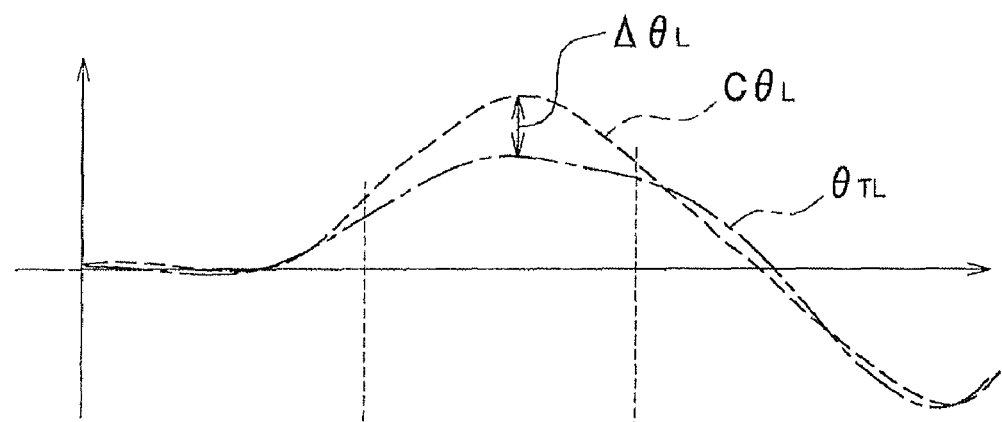
FIG. 6A is a graph showing the transition of the toe angle of the left rear wheel.
Figure 6B:
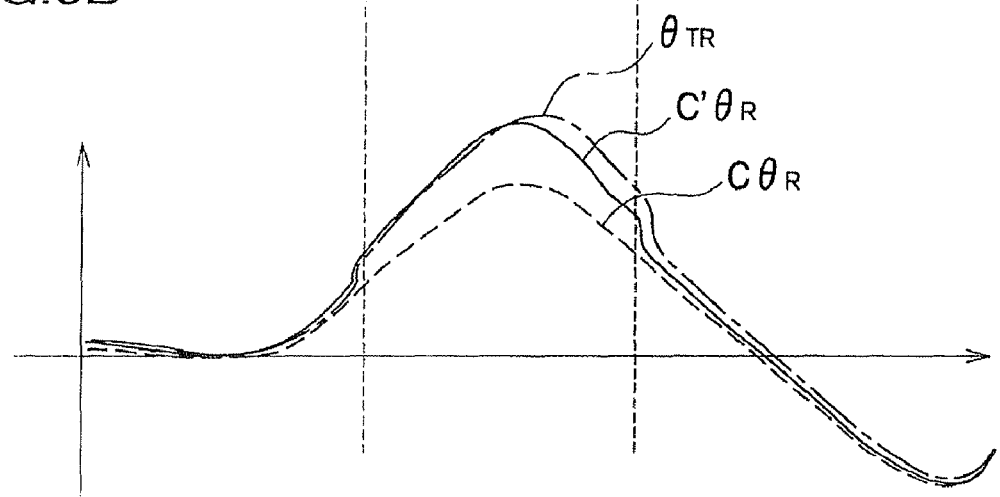
FIG. 6B is a graph showing the transition of the toe angle of the right rear wheel.

In view of the above problem, if the output of the actuator (see FIG. 4) is insufficient and the turning amount of the turning outer rear wheel 2 is insufficient and thus the toe angle of the rear wheel 2 is not set to be equal to the command angle $C\theta$, the toe angle control ECU 130c corrects the command angle $C\theta$, which is the target value of the toe angle set for the turning inner rear wheel 2 (right rear wheel 2R when turning right and the left rear wheel 2L when turning left), to compensate for the decreased lateral force in the present embodiment FIGS. 6A and 6B are graphs showing the transition of the toe angles of the rear wheels at the time when a vehicle is turning. FIG. 6A is a graph showing the transition of the toe angle of the left rear wheel. FIG. 6B is a graph showing the transition of the toe angle of the right rear wheel.

FIGS. 6A and 6B are graphs when the vehicle V (see FIG. 1) turns right and the left rear wheel 2L (see FIG. 1) corresponds to the turning outer wheel. The lateral axis of FIGS. 6A and 6B indicates time, and the upper side of the vertical axis indicates the toe angle of the rear wheel 2 turned left, and the lower side of the vertical axis indicates the toe angle of the rear wheel 2 turned right.

When the vehicle V (see FIG. 1) turns right, the toe angle control ECU 130c (see FIG. 1) calculates the command angles $C\theta_L$, $C\theta_R$, which are shown in the dashed lines in FIGS. 6A and 6B, whose target values are toe angles by which the left and right rear wheels 2L, 2R are turned left. The toe angle control ECU 130c transmits the command angles $C\theta_L$, $C\theta_R$ to the left and right toe angle controllers 120L, 120R respectively as command values to set the toe angles of the rear wheels 2L, 2R.

When a vehicle speed is large and a high lateral acceleration is applied to the vehicle V (see FIG. 1) or the load quantity of the vehicle is large for example, an excessive load is applied to the left rear wheel 2L, which is a turning outer rear wheel, and a reaction force applied to the left rear wheel 2L from a road surface becomes also large. Thus, resistance against the operation of the actuator (see FIG. 3) of the toe angle controller 120L is large and the output of the actuator becomes insufficient, which may result in the insufficient turning of the left rear wheel 2L in left direction.

If the turning amount of the left rear wheel 2L, which is the turning outer wheel, in left direction is insufficient, the toe angle of the left rear wheel 2L is not set to be equal to the left command angle $C\theta_L$ calculated by the toe angle control ECU 130c, and a difference $\Delta\theta_L$ is generated between the left actual angle $\theta T_L$ (shown in a dashed-dotted line in FIG. 6A) and the left command angle $C\theta_L$. In short, the toe angle of the left rear wheel 2L cannot be set to be equal to the left command angle $C\theta_L$.

As described above, when the vehicle V (see FIG. 1) turns right, toe angles of the left and right rear wheels 2L, 2R are set such that the left and right rear wheels 2L, 2R are turned left, whereby a lateral force for assisting the turning of the vehicle V is generated. Therefore, if the toe angle (left actual angle $\theta_{TL}$) of the left rear wheel 2L is not set to be equal to the left command angle COL, the lateral force for assisting the turning of the vehicle V is decreased, which decreases the motion performance of the vehicle V.

In the present embodiment, if the turning amount of the left rear wheel 2L is insufficient and the toe angle of the left rear wheel 2L is not set to be equal to the left command angle $C\theta_L$, generating the difference $\Delta\theta_L$ of more than or equal to a predetermined value between the left actual angle $\theta_{TL}$ and the left command angle $C\theta_L$, the right command angle $C\theta_R$ for the right toe angle controller 120R which turns the right rear wheel 2R is corrected to increase the toe angle of the right rear wheel 2R (right actual angle $\theta_{TR}$). Specifically, the toe angle of the right rear wheel 2R is set to be larger than that set when the toe angle of the left rear wheel 2L is set equal to the left command angle $C\theta_L$ so that a lateral force generated by the right rear wheel 2R is increased. The lateral force which is decreased because the toe angle of the left rear wheel 2L is not set equal to the left command angle $C\theta_L$ is compensated by the increased lateral force generated by the right rear wheel 2R.

In order to correct the right command angle $C\theta_R$, for the right toe angle controller 120R as described above, the toe angle control ECU 130c (see FIG. 5) is provided with a corrected angle calculation unit 131.

The corrected angle calculation unit 131 may be comprised of a software logic which is incorporated in programs for controlling the toe angle control ECU 130c. However, the corrected angle calculation unit 131 is not limited to this, and may be comprised of hardware logic.

Figure 7:
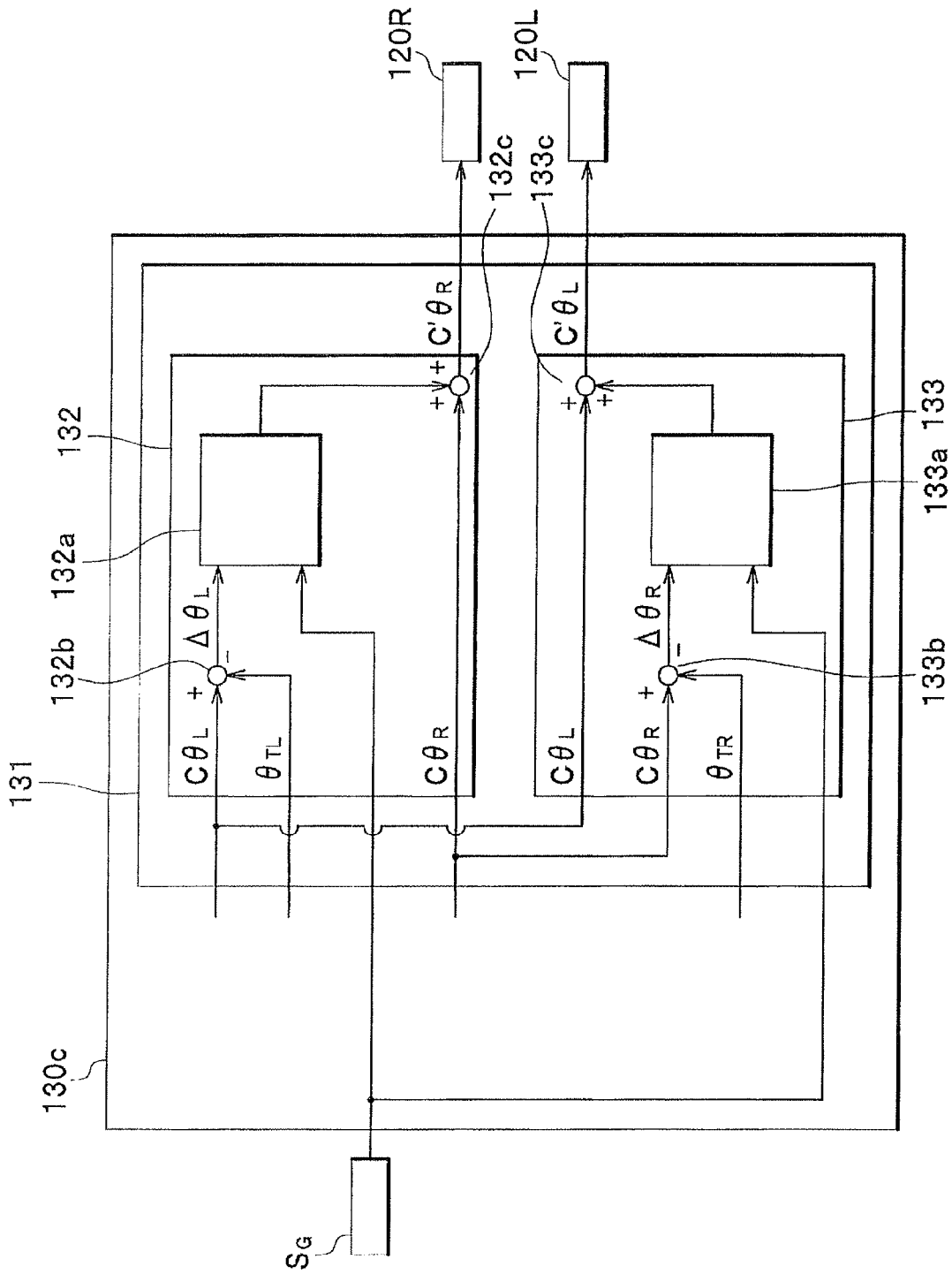
FIG. 7 is a diagram showing an example configuration of a corrected angle calculation unit.

FIG. 7 is a diagram showing an example configuration of corrected angle calculation unit. As shown in FIG. 7, the corrected angle calculation unit 131 provided in the toe angle control ECU 130c includes a right corrected angle calculation unit 132 which corrects the right command angle CUR for the right toe angle controller 120R and a left corrected angle calculation unit 133 which corrects the left command angle $C\theta_L$ for the left toe angle controller 120L.

Although the right corrected angle calculation unit 132 is described hereinafter, the left corrected angle calculation unit 133 operates in the same way as the right corrected angle calculation unit 132 except that the left corrected angle calculation unit 133 and the right corrected angle calculation unit 132 are symmetry.

The left command angle $C\theta_L$ calculated by the toe angle control ECU 130*c* is input to the right corrected angle calculation unit 132.

The actual toe angle of the left rear wheel 2L calculated by the toe angle control ECU 130*c* based on a signal input from the stroke sensor 38 (see FIG. 4) is also input to the right corrected angle calculation unit 132 as the left actual angle $\theta_{TL}$. The right corrected angle calculation unit 132 subtracts the left actual angle $\theta_{TL}$ from the left command angle $C\theta_L$ by the subtracter 132*b* to calculate the difference $\Delta\theta_L$ and the calculated difference $\Delta\theta_L$ is input to an arithmetic part 132*a*.

A lateral acceleration of the vehicle V (see FIG. 1) which is detected by the lateral G sensor $S_G$ is also input to the arithmetic part 132*a*.

If the difference $\Delta\theta_L$ between the left command angle $C\theta_L$ and the left actual angle $\theta_{TL}$ is more than or equal to a predetermined value, the arithmetic part 132*a* determines that the turning amount of the left rear wheel 2L in a left direction is insufficient and the left actual angle $\theta_{TL}$ of the left rear wheel 2L is smaller than the left command angle $C\theta_L$, and corrects the right command angle $C\theta_R$.

In this case, the arithmetic part 132*a* calculates a correction amount based on the difference $\Delta\theta_L$ between the left command angle $C\theta_L$ and the left actual angle $\theta_{TL}$. The right corrected angle calculation unit 132 adds the correction amount calculated by the arithmetic part 132*a* to the right command angle $C\theta_R$ calculated by the toe angle control ECU 130*c* by the accumulation unit 132*c* to calculate corrected right command angle $C'\theta R$.

The toe angle control ECU 130*c* then transmits the corrected right command angle $C'\theta_R$ to the right toe angle controller 120R as a command value so that the right rear wheel 2R is turned in such a manner that the toe angle of the right rear wheel 2R (see FIG. 1) is set to be equal to the corrected right command angle $C'\theta_R$.

Although a method for calculating the correction amount by which the right command angle $C\theta_R$ is corrected is not limited to the following method, a method is possible in which the correction amount is calculated by multiplying the difference $\Delta\theta_L$ between the left command angle $C\theta_L$ and the left actual angle $\theta_{TL}$ by the lateral acceleration and a constant value. In short, the correction amount is a value obtained by "the difference $\Delta\theta_L$"×"the lateral acceleration"×"the constant value".

This is because it is prefereble that as the difference $\Delta\theta_L$ between the left command angle $C\theta_L$ and the left actual angle $\theta_{TL}$ becomes large the correction amount of the right command angle $C\theta_R$ becomes also large.

As the lateral force generated by the toe angle of the left rear wheel 2L (see FIG. 1) depends on the magnitude of the lateral acceleration with respect to the traveling direction of the vehicle V, the correction amount can reflect the effect of the magnitude of the lateral acceleration by multiplying the lateral acceleration as a gain of the correction amount by which the right command angle $C\theta_R$ is corrected.

Furthermore, the right corrected angle calculation unit 132 can reflect the characteristic of the vehicle V in the correction amount by multiplying a constant value which is unique to the vehicle V (see FIG. 1).

For example, the constant value may be set based on an experiment in advance and incorporated in a program for controlling the toe angle control ECU 130*c* as data. Alternatively, the toe angle control ECU 130*c* is provided with a storage unit (not shown) and the constant value may be stored in the storage unit.

It is to be noted that a method performed by the toe angle control ECU 130*c* for calculating the correction amount of the right command angle $C\theta_R$ is not limited to the method represented by "the difference $\Delta\theta_L$"×"the lateral acceleration"×"the constant value".

For example, the vehicle V (see FIG. 1) may be provided with a yaw rate sensor (not shown) for detecting the yaw rate of the vehicle V, and the toe angle control ECU 130*c* may calculate the correction amount by an equation including the yaw rate and the vehicle speed.

Alternatively, the vehicle V (see FIG. 1) may be provided with a load sensor (not shown) for detecting a load applied to the vehicle V, and the toe angle control ECU 130*c* may calculate the correction amount by an equation including the load.

Other than those described above, a correction amount which corresponds to a difference $\Delta\theta_L$ between the left command angle $C\theta_L$ and the left actual angle $\theta_{TL}$ may be set based on an experiment in advance, and the correction amount corresponding to the difference $\Delta\theta_L$ may be stored in a storage unit (not shown) of the toe angle control ECU 130*c* in a map format, for example.

In this case, the right corrected angle calculation unit 132 can calculate the correction amount corresponding to the difference $\Delta\theta_L$ between the left command angle $C\theta_L$ and the left actual angle $\theta_{TL}$ by referring to the storage unit (not shown).

In a case where the vehicle V (see FIG. 1) turns left, the corrected angle calculation unit 131 functions in the same way as in the case where the vehicle V turns right except that right and left is reversed.

Specifically, when the vehicle V turns left, the left corrected angle calculation unit 133 of the corrected angle calculation unit 131 shown in FIG. 7 calculates the difference $\Delta\theta_R$ between the right actual angle $\theta_{TR}$ of the right rear wheel 2R (see FIG. 1), which is the turning outer wheel, and the right command angle $C\theta_R$ from the right toe angle controller 120R. If the difference $\Delta\theta_R$ is equal to or more than a predetermined value, the left corrected angle calculation unit 133 calculates a correction amount which is calculated by "the difference $\Delta\theta_R$"×"the lateral acceleration"×"the constant value".

The left corrected angle calculation unit 133 adds the correction amount calculated by the arithmetic unit 133*a* to the left command angle $C\theta_L$ calculated by the toe angle control ECU 130*c* by the accumulator 133*c* to calculate a corrected left command angle $C'\theta L$.

The toe angle control ECU 130*c* transmits the corrected left command angle $C'\theta_L$ to the left toe angle controller 120L (see FIG. 1) as a command value so that the left rear wheel 2L is turned in such a manner that the toe angle of the left rear wheel 2L is set to be the corrected left command angle $C'\theta_L$.

As described above, the corrected angle calculation unit 131 calculates a correction amount which is obtained by multiplying the difference $\Delta\theta$ between the actual angle $\theta_T$ of the rear wheel 2 (see FIG. 1) and the command angle $C\theta$ calculated by the toe angle control ECU 130*c* with a lateral acceleration. The corrected angle calculation unit 131 also corrects the command angle $C\theta$ by adding the calculated correction amount to the command angle $C\theta$ to calculate a corrected command angle $C'\theta$. Thus, the corrected angle calculation unit 131 corresponds to "a correction unit" described in Claims.

Figure 8:
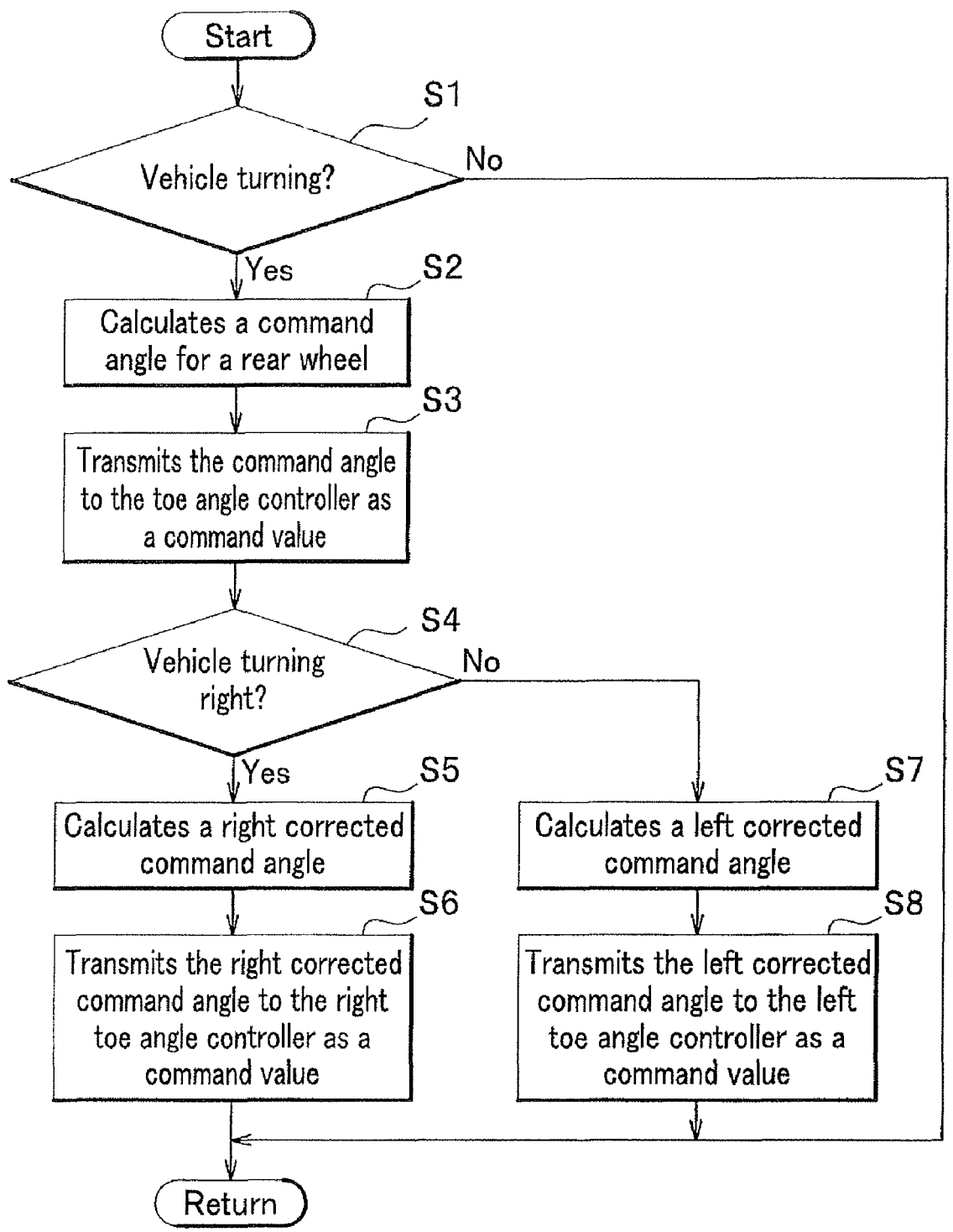
FIG. 8 is a flow chart showing steps performed by the toe angle control ECU for correcting the toe angle of the rear wheel.

FIG. 8 is a flow chart showing steps performed by the toe angle control ECU for correcting the toe angle of the rear wheel. Referring to FIG. 8, steps performed by the toe angle control ECU 130*c* for correcting the toe angle of the rear wheel 2 (see FIGS. 1 to 7 as appropriate) when the vehicle V (see FIG. 1) is turned are described.

As shown in FIG. 8, the toe angle control ECU 130c determines whether or not the vehicle V is turning (step S1). If the vehicle V is not turning (step S1→No), the processing does not perform any step, but if the vehicle V is turning (step S1→Yes), the toe angle control ECU 130c proceeds the processing to step S2.

The toe angle control ECU 130c can determine whether or not the vehicle is turning based on a steering angle of the front wheels 1. More specifically, the toe angle control ECU 130c calculates the steering angle of the front wheel 1 based on a movement amount of the rack shaft 8 input from the steering angle sensor 26. If the toe angle control ECU 130c determines that the front wheel is not steered based on the calculated steering angle, the toe angle control ECU 130c determines that the vehicle V is not turning (step S1→No). On the other hand, if the toe angle control ECU 130c determines that the front wheel 1 is steered, the toe angle control ECU 130c determines that the vehicle V is turning (step S1→Yes).

If the vehicle V is determined to be turning (step S1→Yes) the toe angle control ECU 130c calculates toe angles to be set to the left and right rear wheels 2L. 2R based on the steering angles of the front wheels 1 and the vehicle speed. The toe angle control ECU 130c further calculates command angles $C\theta_L$, $C\theta_R$ for the left and right rear wheels 2L, 2R by taking the calculated toe angles to be target values (step S2). Furthermore, the toe angle control ECU 130c transmits the calculated command angles $C\theta_L$, $C\theta_R$ to the left and right toe angle controllers 120L, 120R as command values (step S3) to set the toe angles of the left and right rear wheels 2L, 2R.

The toe angle control ECU 130c determines the direction in which the front wheel 1 is steered based on the steering angle, and determines whether or not the vehicle V is turning right (step S4).

The present invention may be configured such that the vehicle V is provided with a yaw rate sensor (not shown) for detecting the yaw rate of the vehicle V, and the toe angle control ECU 130c determines whether not the vehicle is turning as well as the turning direction of the vehicle V based on the detected yaw rate.

If the toe angle control ECU 130c determines that the vehicle V is turning right (step S4—Yes), the toe angle control ECU 130c calculates a corrected right command angle C' $\theta_R$ by correcting a right command angle C $\theta_R$ for the right toe angle controller 120R turning the right rear wheel 2R, which is a turning inner wheel (step S5). The toe angle control ECU 130c then transmits the calculated corrected right command angle C'$\theta_R$ to the right toe angle controller 120R as a command value (step S6) to set the toe angle of the right rear wheel 2R.

Returning to step S4, if the vehicle V is not turning right (step S4→No), the toe angle control ECU 130c determines that the vehicle V is turning left, and calculates a corrected left command angle C' $\theta_L$ by correcting the left command angle $C\theta_L$ for the left toe angle controller 120L turning the left rear wheel 2L, which is a turning inner wheel (step S7). The toe angle control ECU 130c then transmits the calculated corrected left command angle C'θL to the left toe angle controller 120L as a command value (step S8) to set the toe angle of the left rear wheel 2L.

In the present embodiment, steps shown in FIG. 8 for correcting the toe angle of the rear wheel 2 which becomes a turning inner wheel when the vehicle V turns are incorporated in programs which controls the toe angle control ECU 130c as a sub routine and are executed periodically (e.g. an interval of 100 msec). With this configuration, if the rear wheel 2 which becomes a turning outer wheel when the vehicle V turns is not turned and thus the toe angle is not set to be the command angle Cθ (target value), it is possible to correct the toe angle of the rear wheel 2 that is the turning inner wheel, which reduces the deterioration of the motion performance of the vehicle V.

The steps shown in FIG. 8 for correcting the toe angle of the rear wheel 2 may be executed by an interrupt processing which is triggered by a change in the steering angle of the front wheel 1 (see FIG. 1) caused when the front wheel 1 is steered. In this case, step S1 in FIG. 8 may be omitted in which the vehicle V (see FIG. 1) is determined to be turning or not.

Figure 9:
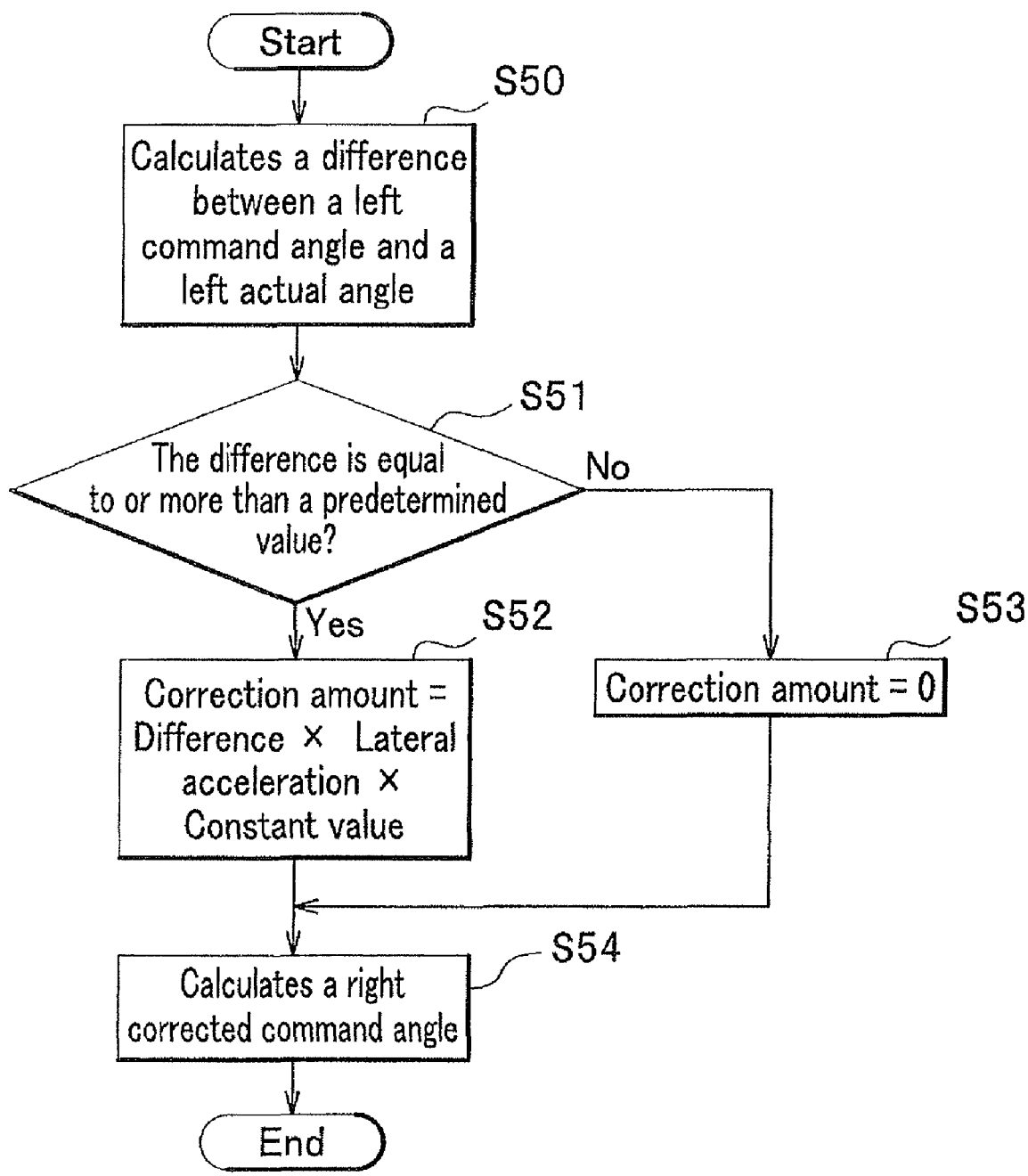
FIG. 9 is a flow chart showing steps performed by the toe angle control ECU for correcting a right command angle for the right toe angle controller to calculate a corrected right command angle.

FIG. 9 is a flow chart showing steps performed by the toe angle control ECU for correcting a right command angle for the right toe angle controller to calculate a corrected right command angle. Specifically, FIG. 9 is a flow chart which describes the detail of step 5 shown in FIG. 8. Referring to FIG. 9, steps are described in which the toe angle control ECU 130c calculates the corrected right command angle C'$\theta_R$ for the right toe angle controller 120R (see FIGS. 1 to 8).

If the toe angle control ECU 130c determines that the vehicle V is turning right, the corrected angle calculation unit 131 which is incorporated in the toe angle control ECU 130c calculates the difference $\Delta\theta_L$ between the left command angle $C\theta_L$, input to the right corrected angle calculation unit 132 and the left actual angle $\theta_{TL}$ of the left rear wheel 2L (step S50).

The left command angle $C\theta_L$ is calculated by the toe angle control ECU 130c based on the steering angles of the front wheels 1L, 1R and the vehicle speed as described above.

The left actual angle $\theta_{TL}$ of the left rear wheel 2L is calculated by the toe angle control ECU 130c based on the movement amount of the rod 35a input from the stroke sensor 38 provided to the left toe angle controller 120L.

If the difference $\Delta\theta_L$ is smaller than the predetermined value (step S51→No), the corrected angle calculation unit 131 sets the correction amount to be 0 (step S53).

More specifically, if the difference $\Delta\theta_L$ is smaller than a predetermined value, the corrected angle calculation unit 131 determines that the rear wheel 2L is turned by the actuator provided to the left toe angle controller 120L and the toe angle (left actual angle $\theta_{TL}$) of the rear wheel 2L is set to be the left command angle $C\theta_L$ calculated by the toe angle control ECU 130c.

It is to be noted that the predetermined value which determines whether or not the difference $\Delta\theta_L$ is large is not limited to a certain value, but may be set appropriately based on a motion characteristic required for the vehicle V.

If the difference $\Delta\theta_L$ is more than or equal to a predetermined value (step S51→Yes), the corrected angle calculation unit 131 sets the correction amount to be a value obtained by "the difference $\Delta\theta_L$"ב"the lateral acceleration"ב"the constant value" (step S52).

In short, if the difference $\Delta\theta_L$ is more than or equal to the predetermined value, the corrected angle calculation unit 131 determines that the turning amount of the left rear wheel 2L in the left direction is insufficient and the left actual angle $\theta_{TL}$ (toe angle) of the left rear wheel 2L is smaller than the left command angle $C\theta_L$ calculated by the toe angle control ECU 130c, and calculates the correction amount of the right command angle $C\theta_R$ for the right toe angle controller 120R which turns the right rear wheel 2R.

As the lateral G sensor $S_G$ is connected to the toe angle control ECU 130c as described above, the right corrected angle calculation unit 132 of the corrected angle calculation unit 131 can detect the lateral acceleration of the vehicle V based on a signal input from the lateral G sensor $S_G$.

As described above, the constant value may be set based on an experiment in advance and incorporated in programs constituting the corrected angle calculation unit 131 as data.

The right corrected angle calculation unit 132 of the corrected angle calculation unit 131 adds the calculated correction amount to the right command angle $C\theta_R$ by the accumulation unit 132c to calculate the corrected right command angle $C'\theta_R$ (step S54).

The corrected angle calculation unit 131 then proceeds the processing to step S6 in FIG. 8.

If the vehicle V is turning right, the toe angle control ECU 130c calculates the right command angle $C\theta_R$ for the right toe angle controller 120R as shown in dashed line in FIG. 6B.

Further, the toe angle control ECU 130c executes the steps shown in FIGS. 8 and 9 to correct the right command angle $C\theta_R$ for the right toe angle controller 120R to be the corrected right command angle $C'\theta_R$ shown in continuous line in FIG. 6B when the difference $\Delta\theta_L$ of more than or equal to a predetermined value is generated between the left actual angle $\theta_{TL}$ of the left rear wheel 2L (see FIG. 1) and the left command angle $C\theta_L$ for the left toe angle controller 120L (see FIG. 1) as shown in FIG. 6A.

The toe angle control ECU 130c (see FIG. 3) transmits the corrected right command angle $C'\theta_R$ to the right toe angle controller 120R (see FIG. 1) as a command value. As a result, the right rear wheel 2R is turned by the actuator provided to the right toe angle controller 120R, and the toe angle of the right rear wheel 2R is set to be the right actual angle $\theta_{TR}$ which is indicated by dashed and dotted line in FIG. 6B, which is substantially the same as the corrected right command angle $C'\theta_R$.

In short, the toe angle of the right rear wheel 2R is set to be larger than that in a case where the difference $\Delta\theta_L$ is not generated between the left command angle $C\theta_L$ for the left toe angle controller 120L turning the left rear wheel 2L (see FIG. 1) and the left actual angle $\theta_{TL}$ of the left rear wheel 2L.

As described above, in the present embodiment, when the vehicle V (see FIG. 1) turns right but a lateral force assisting the turning of the vehicle V is decreased because the toe angle of the left rear wheel 2L, which is a turning outer wheel, can not be set to be a target toe angle, the toe angle of the right rear wheel 2R, which is a turning inner wheel, is corrected to be larger. Thus, the present embodiment has an advantage that the large lateral force generated by the right rear wheel 2R compensates for the decrease of the lateral force caused by the toe angle of the left rear wheel 214 being not set to be the target toe angle, which can reduce the deterioration of the motion performance of the vehicle V.

A step for calculating the corrected left command angle $C'\theta_L$ for the left toe angle controller 120L which is shown as step S7 in FIG. 8 is the same operation as the steps shown in FIG. 9 for calculating the corrected right command angle $C'\theta_R$ except that the right and left is reversed. Specifically, the left corrected angle calculation unit 133 of the corrected angle calculation unit 131 calculates the difference $\Delta\theta_R$ between the right command angle $C\theta_R$ and the right actual angle $\theta_{TR}$, and sets as the correction amount a value obtained by "the difference $\Delta\theta_R$"×"the lateral acceleration"×"the constant value" if the difference $\Delta\theta_R$ is more than or equal to a predetermined value.

The left corrected angle calculation unit 133 of the corrected angle calculation unit 131 adds the calculated correction amount to the left command angle $C\theta_L$ by the accumulator 133c to calculate the corrected left command angle $C'\theta_L$.

Correction of the toe angles of the left and right rear wheels 2L, 2R (see FIG. 1) when the vehicle V (see FIG. 1) is turning has been described above, however, the present embodiment may be employed to a configuration where if one of the toe angle controllers 120 (see FIG. 1) has an error, the toe angle of one of the rear wheel 2 set by the other one of the toe angle controllers 120 operated normally is corrected.

As described above, the toe angle change control ECU 37 (see FIG. 5) of the toe angle controller 120 (see FIG. 1) according to the embodiment includes the self-diagnostic part 81d (see FIG. 5) and monitors whether or not an error is occurred in the toe angle controllers 120.

If an error is detected in one of the toe angle controllers 120, the toe angle control ECU 130c (see FIG. 3) corrects the command angle $C\theta$ for the other one of the toe angle controllers 120 which operates normally.

The toe angle control ECU 130c (see FIG. 5) calculates a correction amount corresponding to the difference $\Delta\theta$ between the command angle $C\theta$ for the toe angle controller 120 (see FIG. 1) in which an error is detected and the actual angle $\theta_T$ of the rear wheel 2 on the side of the toe angle controller 120 having the error, and corrects the command angle $C\theta$ for the toe angle controller 120 operated normally based on the calculated correction amount.

The calculation of the correction amount corresponding to the difference $\Delta\theta$ between the command angle $C\theta$ and the actual angle $\theta_T$ may be carried out by "the difference $\Delta\theta$"× "the lateral acceleration"×"the constant value" similarly to the case where a correction amount is calculated for the turning vehicle V (see FIG. 1) or may be set based on an experiment in advance and stored in a storage unit (not shown) provided in the toe angle control ECU 130c.

If an error is occurred in one of the toe angle controllers 120 shown in FIG. 1 and the toe angle of one of the rear wheels 2 is not set to be the toe angle calculated by the toe angle control ECU 130c, the motion performance of the vehicle V is decreased.

As described above, even if an error is detected in one of the toe angle controllers 120, the present invention has an advantage that the toe angle control ECU 130c corrects the command angle $C\theta$ for the toe angle controller 120 operated normally to prevent the deterioration of the motion performance of the vehicle V which allows a driver to stably drive the vehicle to a repair garage, for example.

As described above, when the toe angle of one of the rear wheels can not be set to be a target value in a vehicle including a toe angle controller which can set the toe angle of the left and right rear wheels independently, the present invention has an excellent effect that the toe angle of the other one of the rear wheel is corrected to reduce the deterioration of the motion performance of the vehicle.

What is claimed is:

1. A vehicle toe angle controller comprising:
   actuators which are provided to left and right rear wheels and change toe angles of the left and right rear wheels;
   a control unit which independently calculates target toe angles to be set to the left and right rear wheels, respectively, and transmits the target toe angles to the actuators as command values;
   toe angle detection units which independently detect actual toe angles of the left and right rear wheels; and
   correction units each of which corrects the target toe angle to be set to one of the left and right rear wheels when a difference between the target toe angle and the actual toe angle of the other one of the left and right rear wheels is equal to or more than a predetermined value, the actual toe angle being detected by the toe angle detection unit.

2. The vehicle toe angle controller according to claim 1, wherein the control unit calculates the target toe angles based on steering angles of steered wheels detected by a steering angle detection unit provided to the vehicle and a vehicle speed detected by a vehicle speed detection device provided to the vehicle.

3. The vehicle toe angle controller according to claim 1, wherein
    if a difference between the target toe angle and the actual toe angle of a turning outer wheel of the rear wheels is equal to or more than a predetermined value in a case where the vehicle turns, the actual toe angle being detected by the toe angle detection unit,
    the correction unit corrects the target toe angle to be set to a turning inner wheel of the rear wheels in accordance with the difference.

4. The vehicle toe angle controller according to claim 1, wherein the vehicle includes a lateral G sensor which detects a lateral acceleration, and the correction unit corrects the target toe angle by calculating a correction amount based on a value obtained by multiplying the lateral acceleration detected by the lateral G sensor with a value of the difference and adding the correction amount to the target toe angle.

5. The vehicle toe angle controller according to claim 2, wherein
    if a difference between the target toe angle and the actual toe angle of a turning outer wheel of the rear wheels is equal to or more than a predetermined value in a case where the vehicle turns, the actual toe angle being detected by the toe angle detection unit,
    the correction unit corrects the target toe angle to be set to a turning inner wheel of the rear wheels in accordance with the difference.

6. The vehicle toe angle controller according to claim 2, wherein the vehicle includes a lateral G sensor which detects a lateral acceleration, and the correction unit corrects the target toe angle by calculating a correction amount based on a value obtained by multiplying the lateral acceleration detected by the lateral G sensor with a value of the difference and adding the correction amount to the target toe angle.

7. The vehicle toe angle controller according to claim 3, wherein the vehicle includes a lateral G sensor which detects a lateral acceleration, and the correction unit corrects the target toe angle by calculating a correction amount based on a value obtained by multiplying the lateral acceleration detected by the lateral G sensor with a value of the difference and adding the correction amount to the target toe angle.

* * * * *